United States Patent [19]

Amerson et al.

[11] Patent Number: 5,615,386
[45] Date of Patent: Mar. 25, 1997

[54] COMPUTER ARCHITECTURE FOR REDUCING DELAYS DUE TO BRANCH INSTRUCTIONS

[75] Inventors: Frederic C. Amerson, Santa Clara; Rajiv Gupta, Los Altos; Balasubramanian Kumar, Cupertino; Michael S. Schlansker, Los Altos; William S. Worley, Saratoga, all of Calif.

[73] Assignee: Hewlett-Packard Company, Palo Alto, Calif.

[21] Appl. No.: 588,151

[22] Filed: Jan. 18, 1996

Related U.S. Application Data

[63] Continuation of Ser. No. 324,857, Oct. 18, 1994, abandoned, which is a continuation of Ser. No. 58,858, May 6, 1993, abandoned.

[51] Int. Cl.[6] ............................................. G06F 9/38
[52] U.S. Cl. ..................... 395/585; 395/587; 395/588; 364/247; 364/247.3; 364/247.6; 364/247.7; 364/DIG. 1
[58] Field of Search .................................. 395/800, 375; 364/247, 247.3, 247.6, 247.7

[56] References Cited

U.S. PATENT DOCUMENTS

| | | | |
|---|---|---|---|
| 4,334,268 | 6/1982 | Boney et al. | 395/375 |
| 4,435,758 | 3/1984 | Lorie et al. | 395/800 |
| 4,742,466 | 3/1988 | Ochiai et al. | 395/375 |
| 4,755,935 | 7/1988 | Davis et al. | 395/375 |
| 4,764,861 | 8/1988 | Shibuya | 395/375 |
| 4,933,847 | 6/1990 | Chau et al. | 395/375 |
| 5,050,068 | 9/1991 | Dollas et al. | 395/375 |
| 5,134,701 | 7/1992 | Mueller et al. | 395/500 |
| 5,193,156 | 3/1993 | Yoshida et al. | 395/375 |
| 5,197,136 | 3/1993 | Kimura et al. | 395/375 |

FOREIGN PATENT DOCUMENTS

| | | | |
|---|---|---|---|
| 0135844A2 | 4/1985 | European Pat. Off. | G06F 9/32 |
| 2250840 | 6/1992 | United Kingdom | G06F 9/38 |

OTHER PUBLICATIONS

"Reducing the Cost of Branches by Using Registers" by Jack W. Davidson and David B. Whalley, Department of Computer Science, University of Virginia, 1990 IEEE.

Hewlett Packard, "PA–RISC 1.1, Architecture and Instruction Set," Reference Manual, Nov. 1990.

Lilja "Reducing the branch penalty in pipelined processor", IEEE Jul. 1988, pp. 47–54.

Farrens "Overview of the pipe processor implementation.", IEEE 1991, 433–443.

Primary Examiner—Alyssa H. Bowler
Assistant Examiner—Dzung C. Nguyen

[57] ABSTRACT

An improved data processing system for executing branch instructions which has lower latency times and which only rarely requires the instruction pipeline to be flushed is disclosed. The data processing system utilizes a register file to hold the information needed to execute a branch instruction. The information is loaded into the register file in advance of the branch instruction. This allows the system to prepare more than one branch instruction at any given time. The present invention may be used to cause the cache line containing the target address of the branch instruction to be loaded soon as the target address is available for the branch instruction. Since the outcome of the branch instruction is almost always known when the branch instruction enters the instruction pipeline, the instruction pipeline only rarely needs to be flushed.

9 Claims, 4 Drawing Sheets

COMPUTER ARCHITECTURE FOR REDUCING DELAYS DUE TO BRANCH INSTRUCTIONS

CROSS REFERENCE TO RELATED APPLICATIONS

This is a continuation of application Ser. No. 08/324,857, filed on Oct. 18, 1994, now abandoned, which is a continuation of application Ser. No. 08/058,858, filed on May 6, 1993, now abandoned.

FIELD OF THE INVENTION

The present invention relates to computer systems, and more particularly, to an improved machine architecture and instruction set which reduces delays due to branch instructions.

BACKGROUND OF THE INVENTION

In spite of the numerous improvements in the operating speed of computers, there is always a need for computers that operate at higher effective throughput. Improved computational speed has been obtained by increasing the speed with which the computer hardware operates and by introducing parallel processing in one form or another. One class of improvements obtained through parallel processing reduce the delays due to the latency time associated with the computer instructions. For the purposes of this discussion, the latency time is defined as the delay between the initiation of an instruction and the time the instruction is actually executed.

Consider an instruction which references data stored in a specified register. This instruction may require 5 machine cycles to execute. In the first cycle, the instruction is fetched from memory. In the second cycle, the instruction is decoded. In the third cycle, the contents of the register are fetched. In the fourth cycle, the instruction is actually executed, and in the fifth cycle, data is written back to the appropriate location. If one were to wait until the instruction execution is completed, only one instruction would be executed every 5 machine cycles.

The effects of the latency time are reduced in pipelined processors by initiating the processing of a second instruction before the actual execution of the first instruction is completed. In the above example, 5 instructions would be in various stages of processing at any given time. The processor would include 5 processors working in parallel, each processor carrying out one of the 5 tasks involved in executing an instruction. While the data for the oldest instruction is being written back to memory or a register, the next to the oldest instruction would be executed by the execution hardware. The register contents needed for the instruction to executed next would be simultaneously being retrieved by the register hardware, and so on.

In principle, pipelined processors can complete the execution of one instruction per machine cycle when a known sequence of instruction is being executed. Unfortunately, computer programs include branch instructions which interrupt the instruction flow. Consider the instruction sequence if x=0 then goto newstart y=z goto somewhere newstart: y=k The first instruction is translated to a branch instruction based on the contents of x. By the time this instruction reaches the execution unit in the pipeline, several additional instructions will have entered the pipeline. However, the computer has no method to determine whether the instruction following the branch should by "y=z" or "y=k" until it actually executes the branch. Thus it is impossible to determine which instructions should be loaded in the pipeline after the branch instruction. Usually, one of the two branch outcomes is assumed to be the correct branch outcome, and the instructions corresponding to the chosen branch outcome are then loaded into the pipeline.

If the wrong sequence of instructions is loaded, the computer must be stalled for a time sufficient to empty and refill the pipeline. Thus, if the instructions corresponding to "y=z" were loaded after the branch instruction and x=0, then the pipeline must be flushed and the instructions corresponding to "y=k" loaded for execution. This delays the execution of the program by a time determined by the number of stages in the pipeline.

Prior art systems have attempted to reduce these delays by predicting the outcome of the branch instruction and then loading the instructions corresponding to the predicted outcome. However, there is no prediction scheme which is 100% accurate. Hence, delays are still encountered.

Branch instructions also cause memory related latency delays. Most modern computer systems utilize cache subsystems to improve the effective access time to the computer's main memory. The cache consists of a high speed associative memory which stores the most recently used instructions and data. When the processor requests the contents of a particular memory location, the cache processor intercepts the request and checks the cache memory to determine if the requested information is in the cache. If the requested information is in the cache, it is returned to the processor with minimal delay. If, however, the requested information is in the main memory, the processor is stalled while the cache retrieves the information. Since main memory speeds are significantly slower than the cache, such cache "misses" introduce significant delays.

Branch instructions often result in cache misses. A branch often causes the computer to continue operation at a memory location that was far from that of the branch instruction. Caches store the most recently used information and information that is close to this information in the main memory. Hence, if the branch is to a distant location, it is unlikely that the next instruction is in the cache.

Another problem encountered with prior art systems for dealing with branch instructions is the inability of these systems to use data generated in processing a first branch instruction to reduce the processing needed for a second branch instruction. A conditional branch instruction may be viewed as comprising three linked instructions. The first instruction computes the target address, i.e., the address of the next instruction to be executed if the branch is taken. The second instruction computes the branch outcome, the outcome of which determines if the branch is to be taken. The third instruction is the actual transfer of control.

In many cases, a number of branch instructions having the same target address will be present in the program. Hence, in principle, a significant amount of processing time could be saved if the results of the target address calculation from the first instruction could be used in the remaining instructions. Prior art computer architectures do not provide an effective method for accomplishing this; hence, the target address is recomputed for each branch. Similarly, the comparison calculation may determine the outcome of several branches.

Finally, prior art systems only provide a means for executing the computations corresponding to one branch instruction at any given time. One important strategy in reducing the effects of latency times involves moving instructions within the instruction sequence. For example, if the compiler knows that a load operation has a latency delay, the compiler can move other instructions in the instruction sequence so that these instructions are being executed during the latency period. This strategy reduces the effects of the latency delay. Unfortunately, the compiler's ability to fill-in these latency delays by performing computations needed for branch instructions is limited by the inability to complete the entire branch computation. For example, prior systems do not provide an effective means for separating the target address computation from the comparison operation to allow the target address to be computed out of order. At most, prior art systems can work on one branch instruction at a time, and if the information for that branch instruction is not available, the branch cannot be computed ahead of time.

Broadly, it is the object of the present invention to provide an improved computer architecture and instruction set for executing branch instructions.

It is a further object of the present invention to provide a computer architecture which reduces the delays encountered in prior art systems due to the need to flush the pipeline when an unexpected branch outcome occurs.

It is a still further object of the present invention to provide a computer architecture which reduces memory latency times introduced by the execution of branch instructions.

It is yet another object of the present invention to provide a computer architecture in which the computations inherent in executing a branch instruction can be shared by a number of branch instructions.

It is a further object of the present invention to provide a computer architecture in which a plurality of branch instructions can be in different stages of processing at any given time.

It is a still further object of the present invention to provide a computer architecture in which the order, as well as the timing, of the address computation and condition computation may be changed relative to that implied by the ordering of the instructions in the code.

These and other objects of the present invention will become apparent to those skilled in the art from the following detailed description of the invention and the accompanying drawings.

SUMMARY OF THE INVENTION

In a data processing system according to the present invention, the instruction processor sequentially executes the instructions of a program until it executes a branch instruction indicating that the instruction processor is to execute the instruction specified by a target address as the next instruction in the program instead of the next instruction in the program sequence. The data processing system uses a register file, connected to the instruction processor, to facilitate the execution of branch instructions. The register file includes one or more registers. Each register is used to store information needed in executing a branch instruction. Each said register includes space for storing a target address of a branch instruction and space for storing a flag having first and second states, the first state indicating that a branch instruction referencing the register should cause the instruction processor to branch to the instruction specified by the target address when an execute branch instruction referencing the register is executed. The second state indicates that the instruction processor should continue executing instructions in the sequential order when an execute branch instruction referencing the register is executed by the instruction processor. The present invention utilizes a "prepare to branch" instruction to load a register with a target address. Conditional branch instructions are implemented with the aid of a compare instruction which sets the flag in a register referenced by the instruction if a specified condition is met.

In one embodiment of the present invention, a prefetch instruction is sent to a cache memory when a flag in one of the registers is set to indicate that a branch is to be taken. The prefetch does not wait for the ultimate value of the flag. The prefetch instruction causes the cache line containing the target address to be loaded into the cache if the cache line in question is not already in the cache. In systems having a hierarchical cache structure, the flag may have more than two states. The additional states may be used to indicate the level in the cache hierarchy at which the copy of the cache line is to be stored, or that the information is to be transferred directly from main memory.

In another embodiment of the present invention, the register referenced by prepare to branch, execute branch, and compare instructions is specified by a pointer register. The contents of the pointer register may be set with the aid of a separate instruction. Alternatively, the contents of the pointer register may be set by an execute branch instruction using data stored in the register file.

DETAILED DESCRIPTION OF THE INVENTION

The present invention utilizes a special register file, referred to as the instruction address register file, to provide an improved instruction set and architecture for implementing branch instructions. Each register in this file is used to store the information needed to execute one branch instruction. The simplest implementation of an instruction address register file is shown at 10 in FIG. 1. Register file 10 provides information needed for instruction process 12 to execute an execute branch instruction, as defined below. Register file 10 preferably includes a plurality of instruction address registers 14. Each register 14 includes space for storing a target address 16 and a flag 18 that determines whether control is to be transferred to target address 16 when instruction processor 12 executes a execute branch instruction that references the register in question.

In a data processor utilizing the present invention, the conventional branch instruction is implemented via three instructions, referred to as prepare to branch (PTB), condition compute (CMP), and execute branch (EB). These instructions execute the three tasks needed to implement a conditional branch instruction. The instructions reference the registers in the instruction address register file. The PTB instruction provides the target address for the branch and stores the address in one of the instruction address registers in the instruction address register file. The specific register is either specified as part of the instruction or by a mechanism that will be discussed in more detail below. For the purposes of the present discussion, it will be assumed that the register is specified as part of the instruction.

Figure 1:
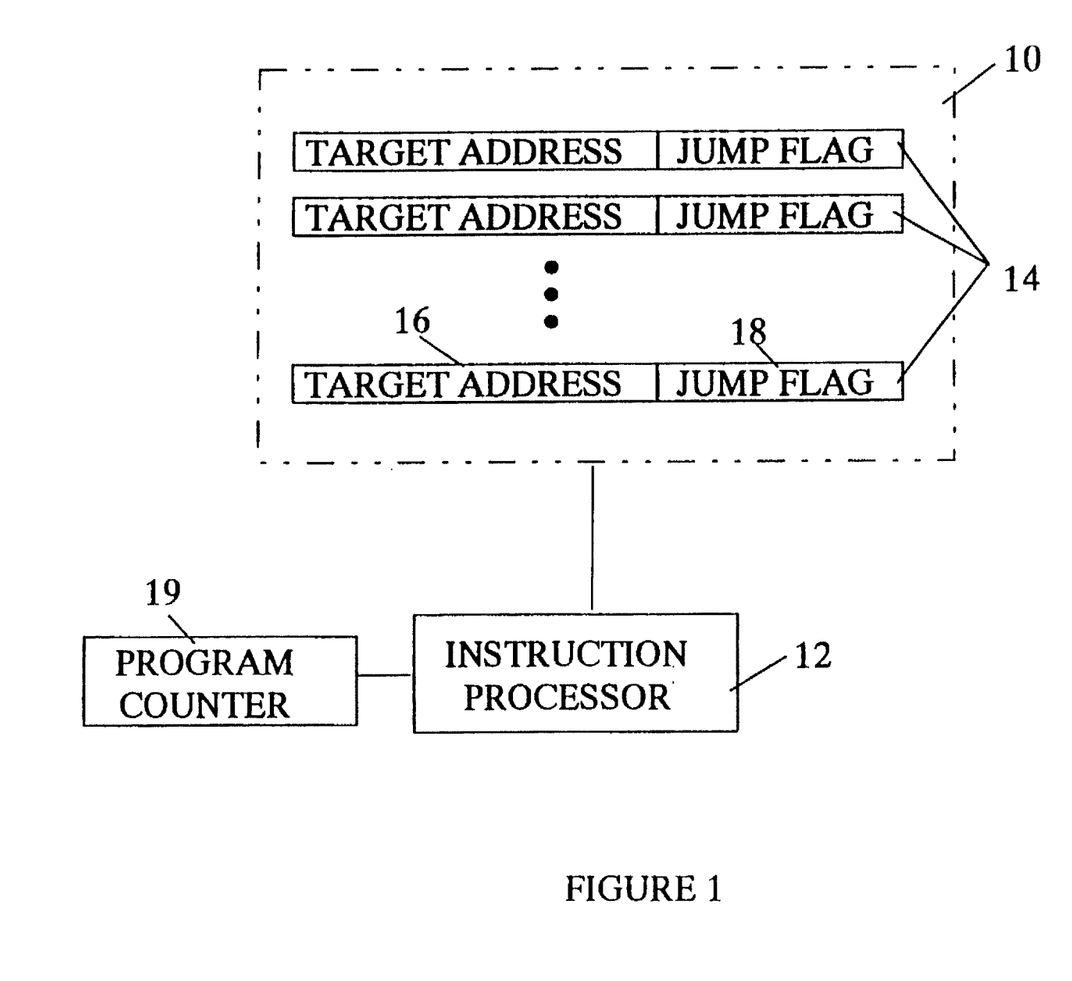
FIG. 1 is a block diagram of one embodiment of a data processing system according to the present invention.

The CMP instruction compares two arguments to determine if the branch is to be taken and accordingly sets the jump flag 18 in the register specified in the compare instruction. In one implementation of the present invention, the jump flag is set to a first state to indicate a jump is to be taken if the two arguments are identical. If the two arguments are not identical, the jump flag is set to a second state that indicates that the jump is not to be taken.

The EB instruction actually executes the branch. When instruction processor 12 executes an EB instruction, it accesses the instruction address register specified in the EB instruction and examines the jump flag in the register. If the jump flag indicates that the branch is to be taken, the next instruction to be executed by instruction processor 12 will be the instruction located at the target address. If the jump flag indicates that the jump is not to be taken, the next instruction to be executed by instruction processor 12 will be the next sequential instruction.

The present invention provides a significant improvement over conditional branch implementation hardware and methods used in the prior art. In the prior art, the target address is computed at the time the comparison operation is performed. Hence, the information needed for a conditional branch instruction cannot be computed early because the arguments to be used in the comparison are not available or may change prior to the point in the code at which the conditional jump is to be executed. In contrast, the present invention allows the target address to be computed as soon as possible, since the arguments for the comparison are not needed. Hence, this work may be used to fill in the latency periods of other instructions. Similarly, the comparison can be made as soon as the arguments are known; hence, this work can also be moved to fill-in the latency period of some other instruction.

It should be noted that when an EB instruction enters the pipeline, the most likely result of the instruction is already stored in the jump flag of the corresponding instruction address register. Hence, the system can make a good guess about the proper location from which to load instructions to follow the EB instruction. In the preferred embodiment of the present invention, the EB instruction reads the appropriate instruction address register as it enters the pipeline. In the vast majority of the cases, the jump flag value will not have changed when the EB reaches the execution point in the pipeline. In this case, the proper instructions will be in the pipeline behind the EB instruction and no flushing of the pipeline will be required. In those cases in which the instructions ahead of the EB in the pipeline result in the flag being changed, the pipeline will be flushed in the conventional manner. However, these cases are expected to occur only rarely since there are typically only a few instructions ahead of the EB that could cause such a change in the flag value. Furthermore, the compiler can almost always rearrange the instruction sequence to guarantee that none of these instructions is a compare referencing the instruction address register in question.

The division of the conventional conditional branch instruction into the above-described three instructions can also result in a significant computational savings. Consider a program having a loop which contains a conditional branch, e.g.

```
While i=0
    instructions
    if x=y then goto error_exit
end
```

With prior art systems, each iteration of the loop requires the processor to determine the address of "error_exit", compare x and y, and then decide on whether or not to branch. With the present invention, the PTB instruction can be moved outside the loop, i.e.,

```
PTB error_exit, iarx
While i=0
    instructions
    CMP x,y, iarx
    EB iarx
end
```

Here, "iarx" identifies one of the registers in the register file. Hence, the PTB instruction need only be executed once. Similarly, if the values of x and y are not changed in the loop, the CMP instruction could also be moved outside the loop, thereby providing additional savings.

In the preferred embodiment of the present invention, the PTB instruction also sets the jump flag to an initial value. This is useful for two reasons. First, by setting the jump flag at the time the PTB instruction is executed, the same architecture can be used to implement both conditional and non-conditional branch instructions. In the case of a non-conditional branch instruction, no CMP instruction is executed between the PTB and the EB instruction.

Second, advanced knowledge of the outcome of the branch may be used to reduce latency times. If the branch is taken, it is likely that the instructions for the code following the branch point are not currently in the cache memory of the data processing system. The cache usually has the instructions that have been most recently executed and instructions that are close to these in the main memory, i.e., instructions that are in the same cache line as those most recently executed. Branch instructions often send the program to a location which is distant from the current location in the main memory; hence, the instructions on the new path are most likely still in main memory.

Prior art systems typically incur a memory latency delay when the first instruction after a branch is executed, since the processor must be stalled while the cache sub-system fetches the appropriate cache line from the main memory. The present invention utilizes a "prefetch" instruction which is activated by the information in the instruction address registers to reduce such latency delays. In the simplest embodiment of the present invention that utilizes this technique, a memory processor issues an instruction to the cache sub-system as soon as it is known that the branch might be taken. This instruction causes the cache sub-system to load the cache line containing the target address from main memory if that cache line is not already in the cache. Thus, as soon as a PTB or CMP instruction causes the jump flag to be set, the cache sub-system begins fetching the required cache line from memory. This significantly reduces the latency delay caused by the branch. The extent of the improvement obviously depends on how far ahead of the execution of the EB instruction the jump flag is set. If it is set sufficiently far ahead, the entire latency delay can be eliminated.

Figure 2:
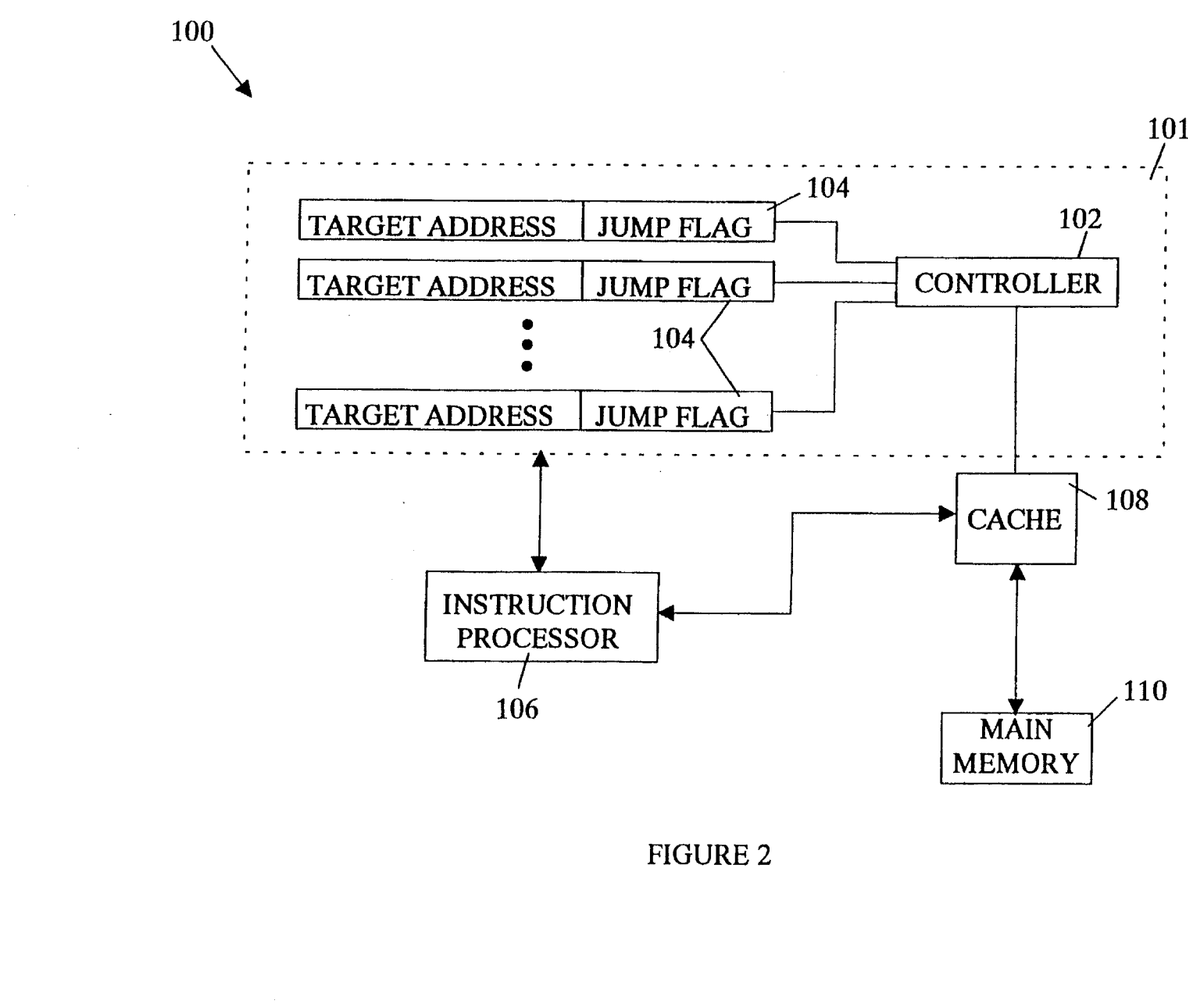
FIG. 2 is a block diagram of a second embodiment of a data processing system according to the present invention.

An embodiment of the present invention which utilizes such a prefetch instruction is shown in FIG. 2 at 100. The instruction address register file 101 includes a controller 102 which scans the jump flags in the instruction address registers 104. When instruction processor 106 causes one of these flags to be set, controller 102 issues a prefetch instruction to cache 108. The prefetch instruction includes the target address stored in the instruction address register with the set jump flag. If the cache line containing that target address is not currently stored in cache 108, cache 108 causes the cache line to be loaded from main memory 110.

While the prefetch instruction described above reduces the effect of the memory latency time encountered when the branch is taken, it can cause problems in cache 108. Each time a new entry is read into a cache, an existing entry in the cache must be discarded. If the entry that is being discarded is likely to be used again in the near future while the incoming entry is only likely to be used once, degradation in cache performance can occur. This degradation stems from the need to reload the discarded entry the next time it is used. This reload operation may introduce a delay while the entry is loaded from main memory. It should be noted that instructions for a branch path are often of the "use once prior to replacement type", since the branch path is often only traversed once in the program.

Figure 3:
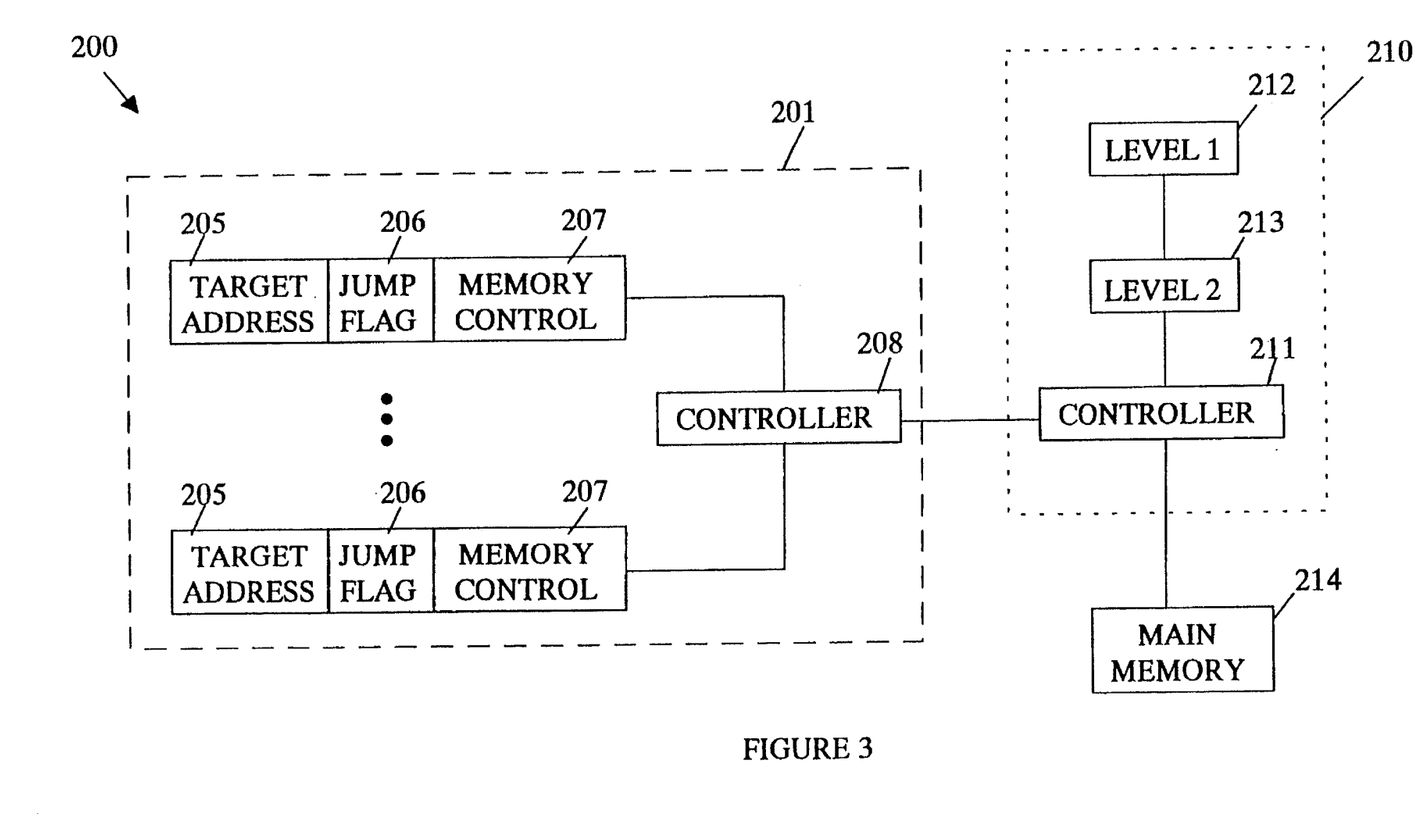
FIGS. 3 is a block diagram of an embodiment of a data processing system utilizing a multi-level cache system according to the present invention.

An embodiment of the present invention that utilizes a multi-level cache system 210 is shown in FIG. 3 at 200. This embodiment of the present invention reduces the problems encountered when entries that are only likely to be used once are sent to the cache. Cache system 210 includes two levels of cache storage shown at 212 and 213. The first level, level 1, operates in a conventional manner. This level is used for storing entries that are expected to be used more than once during their residency cache system 210. Level 1 executes a conventional replacement strategy. For example, the oldest entries in level 1 may be the ones that are replaced by incoming entries. Level 2 is used to store entries that are only likely to be used once during their residency in cache system 210. Hence, the level 2 replacement strategy is chosen to reflect this lack of re-use. For example, a replacement strategy in which an entry is marked for replacement once it has been delivered to the instruction processor may be utilized. Since entries that are only likely to be used once are not introduced into level 1 of the cache, the problems described above are avoided.

In this embodiment of the present invention, the choice of cache level is determined by an additional field 207 in each of the instruction address registers in instruction address register file 201. This information may be provided by the compiler or by the programmer. In addition to determining the cache level, the memory control information 207 may also be used to determine whether controller 208 sends a prefetch instruction to cache system 210. That is, the memory control information may be used in place of the jump flag 206 to determine if a prefetch is to be sent. It will be apparent to those skilled in the art, that the memory control information may be viewed as an extension of the jump flag.

In addition, the memory control information stored in field 207 may include information specifying the priority of the prefetch operation. In many systems, the memory bandwidth between the main memory 214 and the cache levels limits the number of prefetch operations that can be effectively made in the time between the setup of a branch instruction and the actual execution of that instruction. Furthermore, not all branches are equally likely; hence, it is advantageous to provide a mechanism for prioritizing the prefetch operations. The priority information may be loaded by the PTB instruction or some other suitable instruction. The priority information in one embodiment of the present invention includes the probability that the branch will be taken as determined by the linker or compiler. This information may then be used by the controller 208 to set priorities for prefetch operations.

It should be noted that the size of the level 1 cache subsystem need not be large. This sub-system need only be large enough to hold the cache lines for the branch instructions being prepared for execution in instruction address registers 201. At most, one entry is needed per instruction address register.

The above embodiments of the present invention achieve their advantages by replacing the conventional compare and branch instruction by the above-described three instructions. While these embodiments provide substantial benefits the introduction of three instructions for one instruction can increase the size of the program. This increase can be reduced somewhat by utilizing some "combination" instructions that combine the functions of two of the three instructions. For example, a CMP and EB instruction could be combined into a single instruction in which the EB instruction is automatically executed after the CMP part of the instruction. The execution may be immediately after the CMP instruction or at a specified number of machine cycles after the CMP instruction. Similarly, a PTB and EB instruction could be combined into a single instruction for executing unconditional branches. In this case the EB instruction would be executed a predetermined number of machine cycles after the PTB portion of the instruction was executed. The number of machine cycles may be fixed or be part of the combination instruction. It will also be evident that a combination instruction comprising a PTB instruction followed by a CMP instruction may be advantageously utilized.

Figure 4:
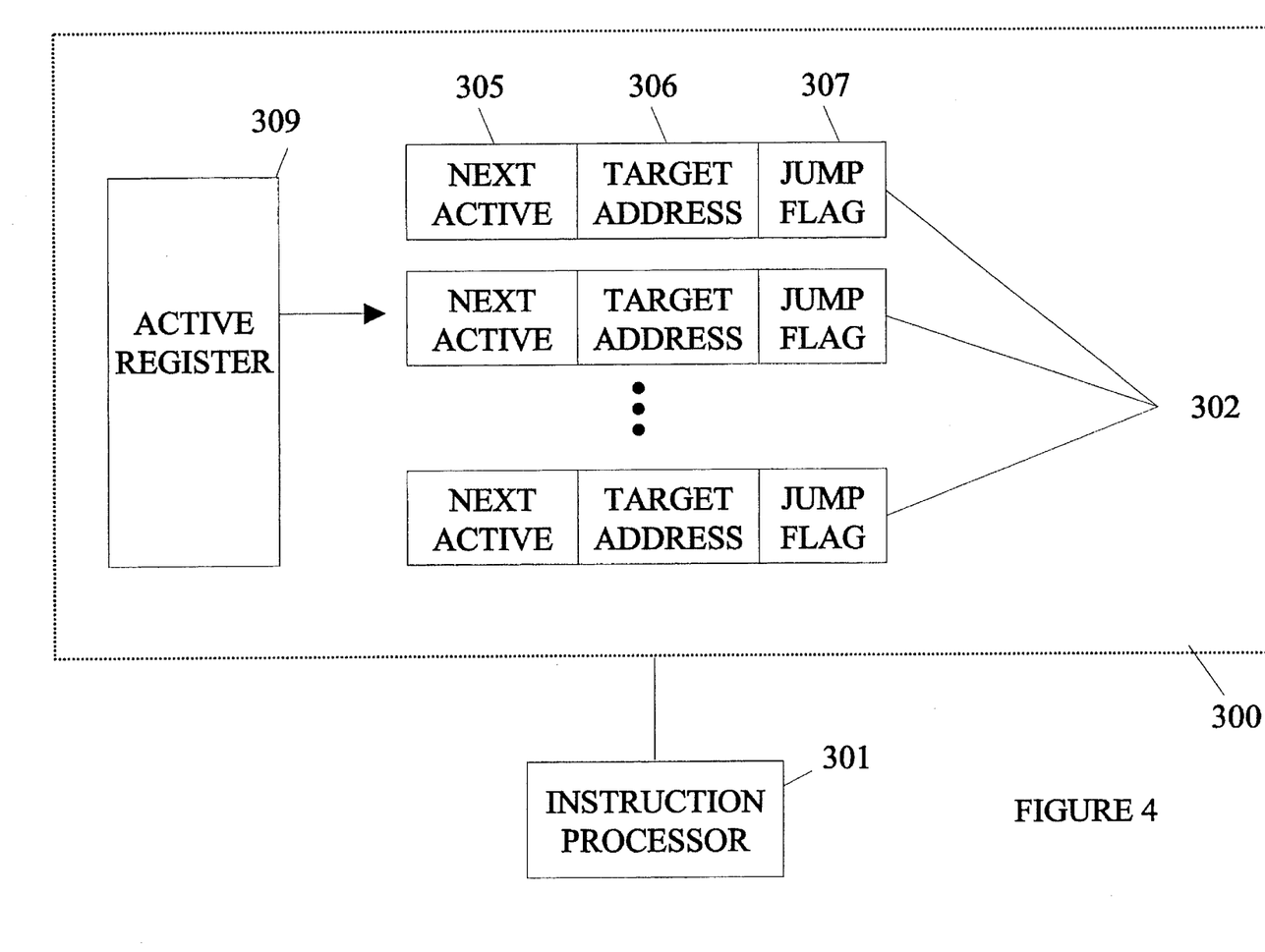
FIG. 4 is a block diagram of a fourth embodiment of the present invention.

In the above-described embodiments of the present invention, the three instructions PTB, CMP, and EB each specify a specific instruction address register. While these embodiments of the present invention provide significant advantages over the prior art, they require the instruction processor to decode information specifying the instruction address register. This requires a significant amount of high-speed hardware. An embodiment of the present invention that avoids this hardware is shown in FIG. 4 at 300. In this embodiment of the present invention, the PTB, CMP and EB instructions reference the instruction address register 302 that is specified by the contents of a register 309. Hence, these instructions do not need to specify the instruction address register in the instruction itself. The contents of register 309 may be changed utilizing a separate instruction intended for this purpose.

In addition, the contents of register 309 may be changed by an EB instruction in the preferred embodiment. In this embodiment, each of the instruction address registers 309 includes a field 305 that specifies the next instruction address register to be the active instruction address register after the EB instruction specifying the currently active instruction address register is executed. The contents of field 305 may be specified in a PTB instruction directed to the instruction address register in question. Alternatively, a specific instruction may be provided for this purpose. Field 305 may be used to store two alternative values for register 309. The first value is used if the jump is taken, the second value is used if the jump is not taken.

Procedure calls are a special class of branch instruction, referred to as branch and link (EBL), in which the address of the next instruction after the procedure call is placed in a register. The address in the register specifies the location at which the program is to resume on return from the procedure. In the case in which the EBL instruction explicitly specifies the instruction address register, a procedure call differs from an ordinary branch only in that the address of the instruction after the procedure call is placed in a specified register. It should be noted that this register could be another instruction address register.

In the case in which a pointer such as register 309 is used to specify the instruction address register which is to be used by the EBL instruction, the preferred embodiment of the present invention utilizes an instruction that differs from the EBL instruction described above in that the contents of register 309, referred to as the nomination register, are specified in the instruction address register utilized by the branch and link instruction for the case in which the branch is not taken. This allows a not taken branch and link instruction to be transparent to the process by which the contents of the nomination register are specified. This information may be stored in the instruction address register by a prepare to branch and link instruction in a manner analogous to that described above for other prepare to branch instructions.

Unfortunately, if the branch and link is taken, two problems occur. First, it is very unlikely that the instruction address register that will be nominated next is of any use to the called procedure. Moreover, the called procedure will have to somehow restore the chain of nomination register values to match the values that would have been used had the branch not been taken when the called procedure returns to the calling procedure. In principle, this can accomplished by saving the nomination register contents in the called procedure and restoring the contents of the nomination register prior to return. However, this requires extra instructions to save and restore the contents of the nomination register. In addition, this method interferes with the prefetching of information from the cache as described above.

In the preferred embodiment of the present invention, the task of saving the contents of the nomination register is a side-effect of the EBL instruction. Two values are stored in the next active field 305. The first specifies the contents of the nomination register if the branch and link is not taken, and the second specifies the register into which the return address is to be placed by the EBL instruction if the branch is taken. As before, if the branch and link is not taken, the contents of the nomination register will be the value specified by the first value in the instruction address register referenced by the EBL instruction. If the branch and link is taken, the return address is stored in the instruction address register specified by the second value in the next active field of the instruction address register utilized by the EBL instruction. In addition, the next active field of the instruction address register in which the return address is stored is set to the value of the first field described above, and the contents of the nomination register are set to point to the instruction address register containing the return address.

For example, assume that an EBL instruction is prepared using IAR2 (i.e., instruction address register 2). That is, the nomination register points to IAR2 when the EBL instruction is executed. Assume that IAR4 is to be nominated next if the branch is not taken, and IAR8 is specified as the instruction address register into which the return address is to be placed at the time of the branch and link if the branch is taken. Hence, when the EBL instruction accesses IAR2, pointers to IAR4 and IAR8 are loaded into the next active field of IAR2.

If the branch and link is not taken, the nomination register points to IAR4 after the EBL instruction. If the branch and link instruction is taken, then EBL instruction not only changes the instruction flow to the target address stored in IAR2, but also stores the return address in the target address field of IAR8 and nominates IAR8 as the next active instruction address register. In addition, the nominate next field (field 305) of IAR8 is set to point to IAR4. That is, IAR8 will be the active instruction address register after the EBL instruction and IAR8 will already have been setup such that an execute branch instruction using IAR8 will result in IAR4 being nominated after the execute branch instruction is executed. The nomination chain is now set up so that the called procedure has only to specify an execute branch instruction to return to the called procedure with nominate pointer pointing to IAR4. This allows the called procedure to be transparent to the calling procedure at least in terms of the nomination chain.

This mechanism may also be used in embodiments in which a branch specifies independent instruction address registers to be nominated next on the taken and not-taken paths, respectively. In this case, a pointer to the nominated not-taken instruction address register becomes the next active register specified in the instruction address register in which the return address is stored.

Traps and interrupts are analogous to EBL instructions in that upon the occurrence of some condition, the computer branches to a new location to execute an exception handling routine, and upon return from this routine, the computer must resume operation as if the trap or interrupt had not occurred. If will be apparent that the above described embodiments may be expanded to include an implicit execute trap or interrupt instruction which references one of the registers which is assigned to hold the target address for the trap or interrupt routine. This register may be loaded with an appropriate prepare to branch instruction. The hardware then performs the equivalent of a branch and link instruction upon detecting the trap or interrupt condition. In addition, the hardware stores the current nomination register contents to use as the nominated register upon return from the trap or interrupt.

While the above-described embodiments of the present invention have been described in terms of a CMP instruction in which two arguments are compared, it will be apparent to those skilled in the an that any condition that may be determined by the processor can be used. It will also be apparent that an instruction having a plurality of CMP instructions may be implemented in which each CMP utilizes a different condition.

In the above-described embodiments of the present invention, the register file was used to store the target addresses of the jump instructions. However, it will be apparent to those skilled in the an that the register file may be used to store pointers specifying the locations at which this information is stored.

From the above-described embodiments of the present invention, it will be clear that the invention provides significant advantages over the prior an solutions to the execution of jump instructions. The present inventions gains these advantages by separating the conventional jump instructions into the three component instructions discussed above.

In the simplest prior an schemes, the operations of address computation, condition determination, and jump execution are bundled into a single instruction. While these schemes advantageously employ jump prediction to reduce the frequency with which the pipeline needs to be flushed, they still require that the pipeline be flushed a significant fraction of the time. In addition, these schemes do not provide the advantages of allowing the computational timing and order to be rearranged to better utilize the latency times inherent in most instructions. Furthermore, these schemes do not provide a means for prefetching the contents of the target address in the case prediction was incorrect. These disadvantages result from the bundling of the component instructions and from waiting until jump execution to determine the correct target address.

One prior art solution to the mis-prediction problem involves utilizing jump instructions which are not executed for a fixed number of machine cycles. This architecture avoids the mis-prediction problems, since the correct branch is known prior to the instruction entering the pipeline. However, this solution is far from optimum, since the component instructions are still bundled together. First, the code must be able to use the fixed number of machine cycles advantageously. To do this, instructions must be moved to fill in this latency time. It is not always possible to move instructions to exactly fill the latency time. In addition, the latency time is hardware dependent; hence, code that is optimized for one hardware platform will not run as well on another platform. Finally, unless the latency time is quite long, one does not obtain the full advantages of prefetching the target addresses into the cache, since there will be insufficient time between determining the target address and the execution of the jump instruction.

A second partial prior art solution to the problems has been to separate the target address computation from the condition computation and jump execution. While this solution, in principle, would allow a prefetch strategy to be implemented for the predicted target address, the problems inherent in mis-prediction are still present. That is, the actual target address is still not determined until the jump instruction is executed. Hence, the pipeline will need to be flushed in a significant fraction of the jump instruction executions and the cache will need to be loaded with the contents of correct target address.

Various modifications to the present invention will become apparent to those skilled in the art from the foregoing description and accompanying drawings. Accordingly, the present invention is to be limited solely by the scope of the following claims.

What is claimed is:

1. A data processing system for executing a program comprising an instruction sequence including a plurality of instructions in an ordered sequence, said data processing system comprising:

an instruction processor for executing said instructions of said program;

a register file, operatively connected to said instruction processor, comprising:

one or more registers, each said register including means for storing a target address of a branch instruction and means for storing a flag having first and second states; and a pointer register which specifies which of said registers in said register file is referenced by the next execute branch instruction;

wherein said instructions include execute branch instructions, and wherein said first state of said flag in said specified register causes said instruction processor to execute the instruction specified by said target address in said specified register when one of said execute branch instructions is executed by said instruction processor, and said second state of said flag in said referenced register causes said instruction processor to execute the instruction in said instruction sequence immediately following said execute branch instruction when said execute branch instruction is executed by said instruction processor.

2. The data processing system of claim 1 wherein said register file comprises at least two said registers.

3. The data processing system of claim 1 wherein said instructions further comprise a compare instruction, said compare instruction causing said instruction processor to determine if a condition specified by said compare instruction is true and to set said flag in one of said registers to one of said states in response to said determination.

4. The data processing system of claim 1 wherein each said register in said register file further comprises means for storing a value to be stored in said pointer register, and wherein said execute branch instruction causes said stored value to be loaded into said pointer register when said execute branch instruction referencing said register is executed by said instruction processor.

5. The data processing system of claim 1 wherein said instructions further comprise an execute branch and link instruction, wherein said registers each comprise means for storing first and second values and wherein the execution of said branch and link instruction causes a return address to be loaded into a register specified by said second value, said first value to be stored in said specified register, and said pointer register loaded with said second value.

6. The data processing system of claim 1 wherein said instructions further comprise a prepare to branch instruction that includes an address as a pan thereof and wherein said instruction processor causes said address to be stored in said target address storing means of a specified one of said registers, said prepare to branch instruction being executed prior to executing said execute branch instruction referencing said one of said registers.

7. The data processing system of claim 6 wherein said prepare to branch instruction further comprises a default flag value, and wherein said instruction processor causes said default flag value to be stored as said flag of said specified one of said register.

8. The data processing system of claim 1 further comprising:

a cache memory for storing copies of information normally stored in a slower main memory, said cache memory being operatively connected to said instruction processor; and cache loading means, operatively connected to said register file and said cache memory, for causing said cache memory to store a copy of the instruction specified by said target address in one of said registers when said flag is in a predetermined state, said cache memory being caused to store said copy of said instruction independent of the execution of said execute jump instruction referencing said register.

9. The data processing system of claim 8 wherein said cache memory includes a plurality of memory levels, wherein said flag has more than two states, and wherein said flag state determines the memory level at which said copy of said instruction specified by said target address is stored.

* * * * *